United States Patent [19]
Solomon

[11] 4,342,501
[45] Aug. 3, 1982

[54] RADIANT ENERGY COLLECTOR WITH FOCAL POINT BETWEEN THE PLANE OF THE FRAME AND EARTH

[75] Inventor: Murray Solomon, II Vineyard Rd., Newton, Mass. 02159

[73] Assignee: Murray Solomon, Newton, Mass.

[21] Appl. No.: 172,470

[22] Filed: Jul. 25, 1980

[51] Int. Cl.³ .......................... G02B 5/10; G02B 7/18
[52] U.S. Cl. ..................................... 350/296; 248/487
[58] Field of Search ................ 350/296, 293; 126/425, 126/424, 438, 451; 353/3; 248/476, 487

[56] References Cited

U.S. PATENT DOCUMENTS

| | | | |
|---|---|---|---|
| 2,460,482 | 1/1949 | Abbot | 126/425 |
| 3,977,773 | 8/1976 | Hubbard | 126/425 |
| 3,998,206 | 12/1976 | Jahn | 126/425 |
| 4,111,184 | 9/1978 | Perkins | 126/451 |
| 4,171,876 | 10/1979 | Wood | 126/438 |
| 4,190,766 | 2/1980 | Young | 250/203 R |

*Primary Examiner*—Jon W. Henry

[57] ABSTRACT

The problem of focusing the radiant energy collected by a heliostat at a fixed point as the collector tracks the sun is resolved by mounting the reflector on a circular frame such that its focal point is located along the axis of symmetry of the frame. Means are provided for pivoting the reflector axis about its focal point. This includes a plurality of parallel, curved tracks, each of which is a portion of a circle that intersects the circular frame, and means for rotating said tracks about the frame. With the plane of the frame inclined at an angle to the surface of the earth that is the complement of the site's latitude location, the focal point is advantageously positioned between the plane of the frame and the surface of the earth.

3 Claims, 3 Drawing Figures

RADIANT ENERGY COLLECTOR WITH FOCAL POINT BETWEEN THE PLANE OF THE FRAME AND EARTH

BACKGROUND OF THE INVENTION

The function of a heliostat is to collect radiant energy from the sun (or other source) and to concentrate the radiation at a convenient location for subsequent use. Typically, a heliostat includes a reflector mounted on a frame in a manner which permits the reflector to rotate so as to track the sun as it moves relative to the earth during the course of the day. Various arrangements for accomplishing this are disclosed in U.S. Pat. Nos. 2,460,482; 4,171,876; and 3,977,773. The difficulty with all these systems, however, is that the focal point at which the collected energy is concentrated is not conveniently located, and/or is not fixed relative to the earth. As a result, some further means must typically be provided to transfer the heat collected at the focal point of the reflector to another location before it can be utilized. In a preferred arrangement, the focal point of the reflector would be located at a convenient place away from the collector structure, and would remain fixed at that point regardless of the orientation of the reflector.

SUMMARY OF THE INVENTION

A radiant energy collector, in accordance with the present invention, comprises a reflector, whose reflecting surface is a portion of a conic of revolution, mounted upon a supporting circular frame such that its focal point is located along the axis of symmetry of the frame. Means are provided for pivoting the reflector axis about its focal point. This includes a plurality of parallel, curved tracks, each of which is a portion of a circle that intersects the circular frame, and means for rotating said tracks about the circular frame. Mounted in this manner, the collector has all the degrees of freedom required to track the sun when used as a heliostat. In particular, when so used the circular frame is inclined at an angle to the surface of the earth that is the complement of the site latitude, and the focal point of the reflector is located between the plane of the frame and the earth. Arranged in this manner, the reflector can track the sun on a daily basis simply by rotating about the axis of symmettry of the circular frame. Corrections to accommodate changes in the declination of the sun can be made separately on a day to day basis by changing the angle between the reflector axis and the frame axis. A heliostat with a fixed focal point is shown in U.S. Pat. No. 4,111,184. However, because of the orientation of the supporting frame, a more complicated tracking arrangement is required. In addition, the location of the focal point is less convenient. Thus, it is an advantage of the present invention that the reflector is free to track the movement of an energy source without changing the location of its focal point, which can be located at a convenient point. When used as a heliostat, the reflector is free to track the sun on a day basis merely by rotating about its axis.

DETAILED DESCRIPTION

Figure 1:
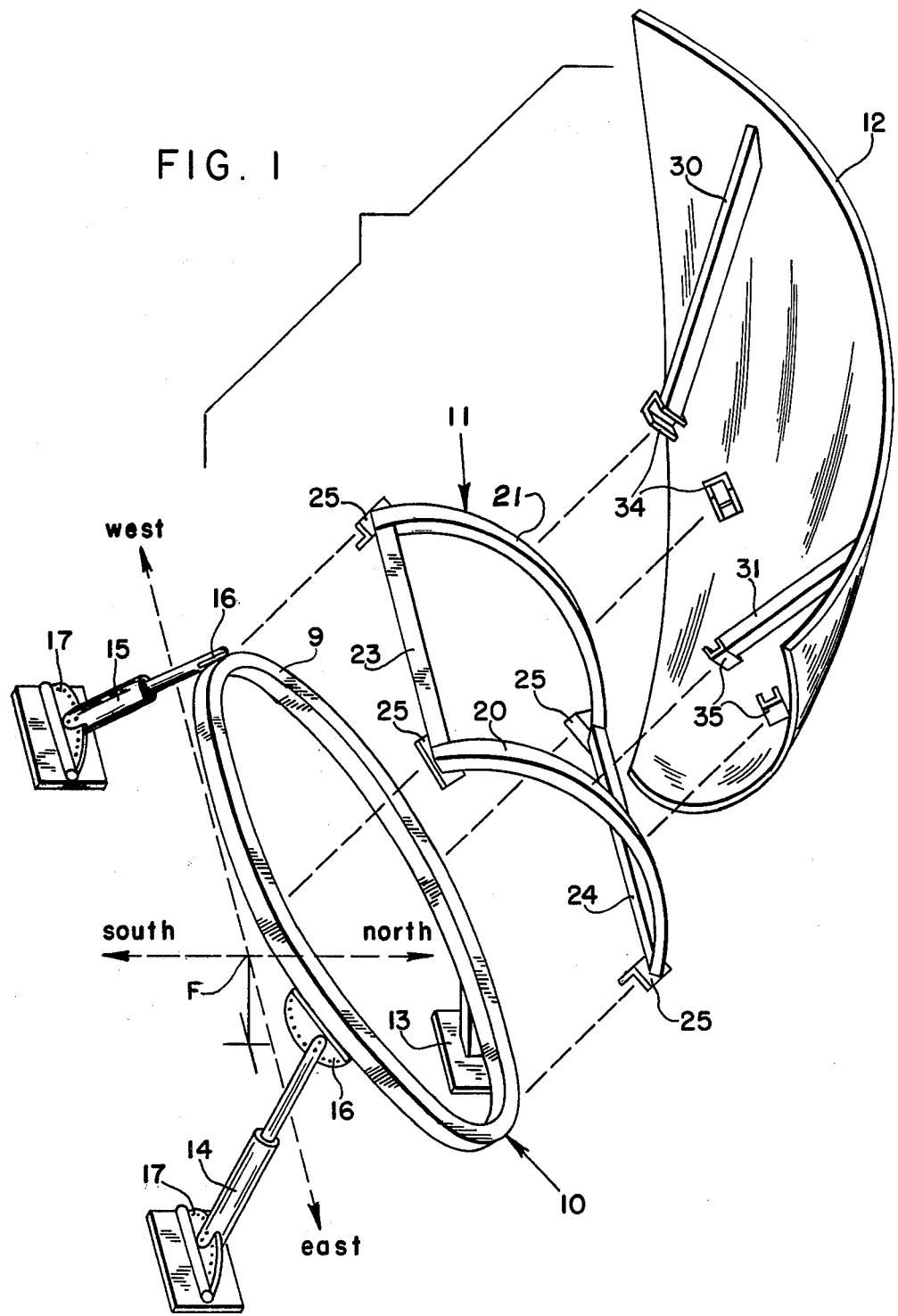
FIG. 1 is an exploded view of the invention.
Figure 2:
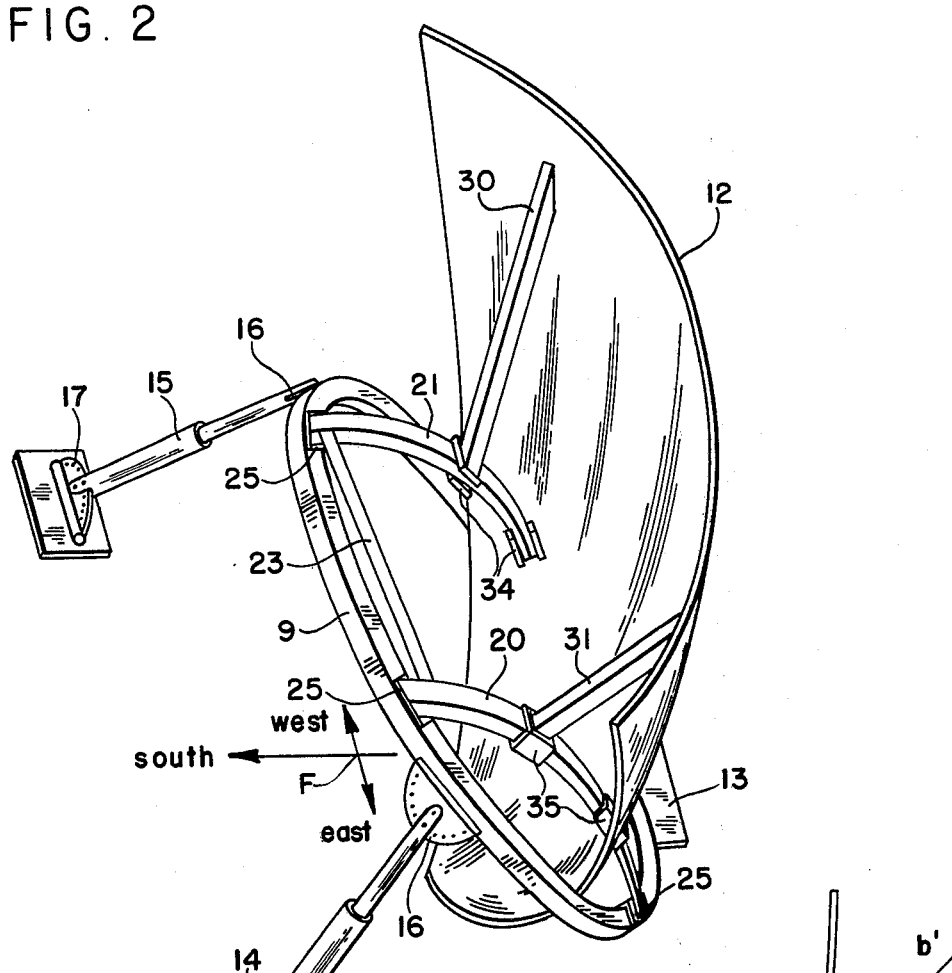
FIG. 2 is an assembled view of the invention.

Referring to the drawings, FIGS. 1 and 2 show an illustrative embodiment of a radiation concentrator in accordance with the present invention. For the purposes of explanation, FIG. 1 is an exploded view of the device whereas FIG. 2 shows the invention with the components assembled. Using the same identification numerals for corresponding parts in both figers, the concentrator comprises a support structure 10, a rotatable chassis 11 and a reflector 12. The support structure 10 includes a circular frame 9 supported at a number of points by means of support members 13,14 and 15 distributed about the periphery of the frame. If the structure is designed for a specific location, the supports can be permanently affixed members. If, on the other hand, the device is intended to be moveable, telescoping supports are advantageously employed. In the latter case, supports 14 and 15 can be adjustably attached to universal joints 16 disposed about the periphery of frame 9, and to similar adjustable connectors 17 placed on the ground. For the purposes of illustration, the adjustable connectors 16 and 17 are shown as semi-circular plates to which the forked ends of the supporting members 14 and 15 are attached.

Chassis 11 comprises a pair of curved tracks 20 and 21 which are held parallel to each other by means of crossmembers 23 and 24. Each track is a portion of a circle that intersects frame 9 and whose center lies along a common line that extends along a direction parallel to the plane of the frame. This imaginary line also passes through the focal point of the reflector 12, as will be explained in greater detail herein below.

Chassis 11 is also provided with a plurality of bearings 25, which are adapted to engage frame 9, the bearings are disposed about the chassis, being connected either to the tracks or the crossmembers. The number of bearings employed will depend upon the weight to be supported.

Reflector 12 is supported on chassis 11 by means of braces 30 and 31. The braces and the reflector are provided with pairs of brackets 34 and 35 which are fitted to engage tracks 20 and 21.

The reflector panel can be a section of a conic of revolution provided with a suitably reflective surface (silvered glass, aluminized plastic, etc.), or the equivalent of a conic reflector can be employed, comprising a flat surface upon which a plularity of small mirrors are mounted, each being positioned and directed so as to reflect the incident radiation to a common focal point.

The reflector 12 is generally designed such that when mounted upon the chassis 11, its focal point F falls within the region between the plane of the frame and the plane of the ground, as shown in FIG. 1. In addition, the focal point lies along the intersection of the line that includes the centers of curvature of the tracks 20 and 21, and the axis of symmetry of frame 9.

Figure 3:
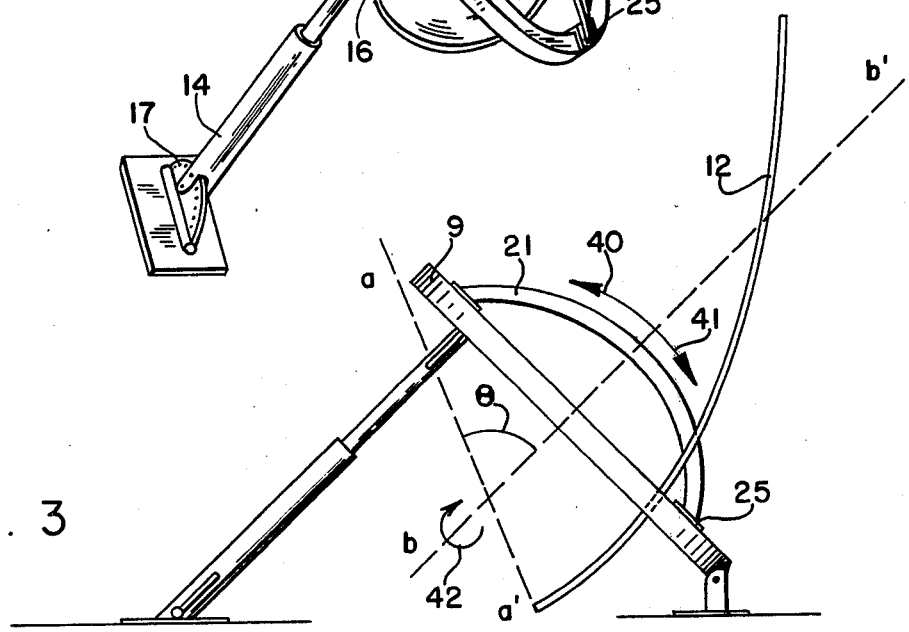
FIG. 3 is a cross section of the concentrator showing the manner in which the reflector can be moved.

Designed in this manner, reflector 12 can be adjusted in two ways. First, it can be moved along tracks 20 and 21, which motion serves to vary the angle between the axis of revolution of the reflector and the axis of symmetry of the frame. Secondly, it can be rotated by rotating chassis 11 about the frame 9. This latter motion serves to rotate the axis of the reflector about the frame axis. It will be noted, however, that neither of these adjustments changes the location of the focal point F. The focal point remains fixed at all times. The only thing that changes is the orientation of the axis of revolution of the reflector which, in effect, pivots about the focal point. This is illustrated in FIG. 3 which shows in cross section, frame 9, track 21 and reflector 12. Motion of the latter along the tracks, as indicated by arrows 40-41 changes the angle $\theta$ between the axis of revolution a-a' of the reflector and the axis of symmetry b-b' of the frame 9. Rotation of the reflector about the frame causes causes the reflector axis to rotate about the axis of symmetry of the frame, as indicated by the curved arrow 42.

When used as a heliostat to collect solar radiation, the collector is aligned such that the east-west direction is parallel to the plane of frame 9, as indicated in FIGS. 1 and 2. In the northern hemisphere, the southern end of the frame would be raised such that the frame makes an angle with the earth that is the complement of the site's latitude. This orientation is also indicated in FIGS. 1 and 2. To track the sun during the day, the chassis is rotated about the frame 9. To adjust for seasonal changes in the elevation of the sun, the reflector is moved along tracks 20 and 21. Means for automatically making such adjustments are known to those skilled in the art. See, for example, U.S. Pat. Nos. 4,129,360, 4,171,876 and 4,190,766.

What is claimed:

1. A radiant energy concentrator comprising:

a radiation reflector (12) whose reflecting surface is a portion of a conic of revolution;

a circular frame (9) inclined at an angle to the surface of the earth;

means for mounting said reflector on said frame such that the focal point of said reflector is located along the axis of symmetry of said frame at a point between the plane of said frame and the earth;

said mounting means including a plularity of parallel, curved tracks (20,21), each of which is a portion of a circle that intersects said circular frame (9);

means (30,31,34,35) for slidably mounting said reflector (12) on said tracks (20,21);

and means (25) for rotating said tracks (20,21) about said frame (9).

2. The concentrator according to claim 1 wherein said frame (9) is inclined at an angle to the surface of the earth that is the complement of the site latitude.

3. The concentrator according to claim 1 wherein each of said tracks (20,21) is a portion of a circle whose center lies along a common line that passes through the focal point of said reflector (12) and is parallel to the plane of said frame (9).

* * * * *